US011238474B2

(12) United States Patent
Price et al.

(10) Patent No.: US 11,238,474 B2
(45) Date of Patent: Feb. 1, 2022

(54) DISTRIBUTED ENERGY CONTROL

(71) Applicant: Hunt Energy Enterprises, L.L.C., Dallas, TX (US)

(72) Inventors: Daniel Gregory Price, Dallas, TX (US); John Franklin Allen, Jr., Dallas, TX (US); Victor Kuang-En Liu, Richardson, TX (US); Robert D. Maher, III, Frisco, TX (US)

(73) Assignee: HUNT ENERGY ENTERPRISE, L.L.C., Dallas, TX (US)

( * ) Notice: Subject to any disclaimer, the term of this patent is extended or adjusted under 35 U.S.C. 154(b) by 0 days.

(21) Appl. No.: 16/289,860

(22) Filed: Mar. 1, 2019

(65) Prior Publication Data

US 2019/0385182 A1   Dec. 19, 2019

Related U.S. Application Data

(60) Provisional application No. 62/685,734, filed on Jun. 15, 2018.

(51) Int. Cl.
| | |
|---|---|
| *G06Q 30/02* | (2012.01) |
| *H02J 3/28* | (2006.01) |
| *H02J 13/00* | (2006.01) |
| *G06Q 50/06* | (2012.01) |
| *H02J 3/00* | (2006.01) |

(52) U.S. Cl.
CPC ......... *G06Q 30/0206* (2013.01); *G06Q 50/06* (2013.01); *H02J 3/008* (2013.01); *H02J 3/28* (2013.01); *H02J 13/0006* (2013.01); *H02J 3/003* (2020.01)

(58) Field of Classification Search
None
See application file for complete search history.

(56) References Cited

U.S. PATENT DOCUMENTS

| | | | |
|---|---|---|---|
| 2004/0044442 A1* | 3/2004 | Bayoumi | H02J 3/00 700/286 |
| 2014/0336960 A1* | 11/2014 | Haghighat-Kashani | G06F 16/212 702/60 |
| 2016/0209858 A1* | 7/2016 | Ellice-Flint | G05F 1/66 |

OTHER PUBLICATIONS

Transmittal and PCT International Preliminary Report for International Application No. PCT/US2019/037044, dated Dec. 24, 2020, 7 pages.

* cited by examiner

*Primary Examiner* — Mohammad Ali
*Assistant Examiner* — Saad M Kabir
(74) *Attorney, Agent, or Firm* — Baker Botts LLP

(57) ABSTRACT

A system includes an energy storage device geographically proximate a plurality of load centers. The energy storage device is coupled to one or more of the plurality of load centers for supplying energy to the load centers and is also coupled to an energy generation source for receiving energy from the energy generation source. The system also includes a control system that is operable to receive energy market data, monitor the plurality of load centers, the energy storage device, and the energy generation source, and control the charging and dispatching of the energy storage device based on the monitoring and the energy market data.

19 Claims, 4 Drawing Sheets

DISTRIBUTED ENERGY CONTROL

RELATED APPLICATIONS

This application is based upon and claims priority to U.S. Provisional Patent Application No. 62/685,734, entitled "Distributed Energy Control," filed 15 Jun. 2018.

TECHNICAL FIELD

Particular embodiments relate generally to intelligent control of distributed energy generation and storage.

BACKGROUND

The current utility structure relies on centralized, one-way, large megawatt generators that distribute power long distances. An example is illustrated in FIG. 1.

FIG. 1 is a block diagram illustrating an example power generation and distribution system. Power generation and distribution system 10 includes power generation unit 12, long distance transmission facilities 14, and load centers 16.

Power generation unit 12 generates megawatts of power for transmission over long distance transmission facilities 14, for use at load centers 16, such as residential and commercial structures.

At load centers 16, the power is reduced to consumer kilowatt (kW) levels. The distances between power generation unit 12 and load centers 16 create areas of congestion. For example, power may be constrained to get in or power may be constrained to get out at certain times of the day and/or certain times of the year. Thus, wholesale prices of energy may be volatile during the constrained times.

Additionally, base load energy plants fueled by coal are being decommissioned for economic and environmental reasons. They are being replaced with large renewable energy projects. The renewable projects, however, may exacerbate volatility because they are subject to the intermittency of the energy source (e.g., solar, wind, etc.). Thus, the problem compounds if the large-scale, centralized model continues. One solution includes building more transmission projects. With little appetite for the cost or for the regulatory land acquisition, however, future transmission projects will undergo longer regulatory approval processes.

SUMMARY

According to some embodiments, a distributed renewable energy generation and energy storage system comprises: a plurality of load centers (homes, businesses, industrial equipment, etc.); an energy generation source (e.g., solar, wind, etc.); and an energy storage device (e.g., battery) geographically proximate the plurality of load centers. The system also includes a controller operable to: receive energy market data (current pricing, future pricing, weather forecast, etc.); monitor the plurality of load centers, the energy storage device, and the energy generation source; and control the charging and dispatching of the energy storage device.

In some embodiments, a system for automatically trading in energy markets comprises a control server comprising a processor coupled to a memory. The processor is operable to: receive charging and dispatching information from a plurality of distributed energy storage devices; receive energy market data; and based on the received charging and dispatching information and the received energy market data, optimize an amount of energy that may be resold into the energy markets from the plurality of distributed energy storage devices.

BRIEF DESCRIPTION OF THE DRAWINGS

For a more complete understanding of the particular embodiments, and the advantages thereof, reference is now made to the following written description taken in conjunction with the accompanying drawings, in which.

DETAILED DESCRIPTION

New technologies in distributed energy generation and storage (e.g., batteries) have progressed in efficiencies and in lowered cost. An efficient use of batteries is to store energy closer to the load centers. In addition, batteries may receive energy from distributed renewable generation sources located in close proximity to the batteries. Batteries can be sized so that they fit inside smaller footprints close to the load centers.

A remaining problem is that lone individual batteries will have a limited effect on changing the long-distance congestion issues. Particular embodiments obviate the problems described above and include a network of distributed renewable energy generation and energy storage. The network of distributed renewable energy generation and energy storage creates scale that fundamentally changes and prepares the utility energy infrastructure for the future.

The following description sets forth numerous specific details. It is understood, however, that embodiments may be practiced without these specific details. In other instances, well-known structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 2-5 of the drawings, like numerals being used for like and corresponding parts of the various drawings.

Figure 2:
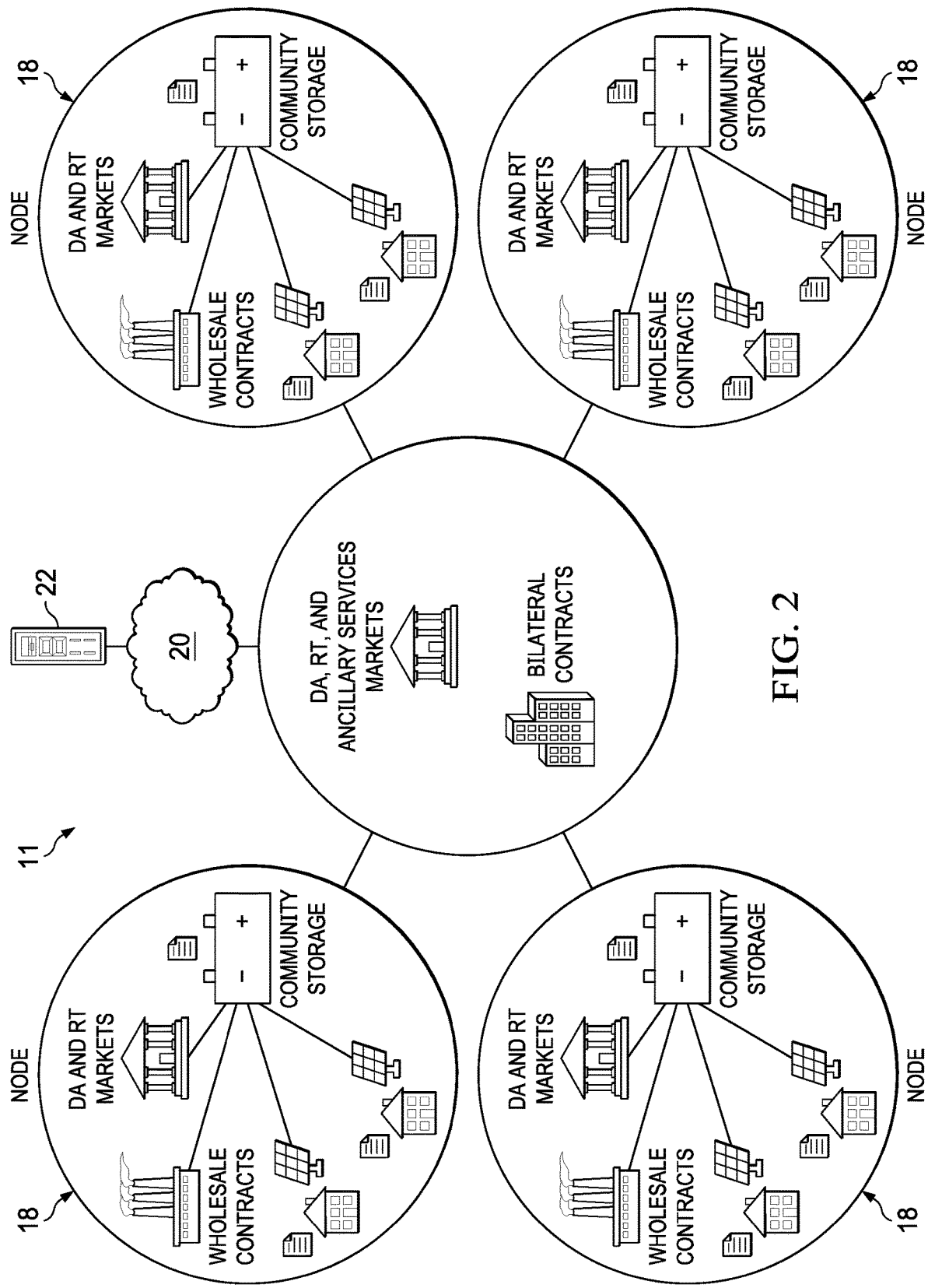
FIG. 2 is a block diagram illustrating a network of distributed renewable energy generation and energy storage, according to some embodiments.

FIG. 2 is a block diagram illustrating a network of distributed renewable energy generation and energy storage, according to some embodiments. Distributed energy generation and storage system 11 includes one or more nodes 18. Nodes 18 may include one or more load centers (e.g., residential, commercial, etc. energy consumers) that receive energy from one or more geographically proximate community storage devices (e.g., batteries). The components of nodes 18 may be connected to a control network 20.

In certain embodiments, control network 20 may refer to any interconnecting system capable of transmitting audio, video, signals, data, messages, or any combination of the preceding. Control network 20 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. Control network 20 may communicably couple the components of nodes 18 with control server 22.

Control server 22 may coordinate the components of nodes 18 so that each node 18 operates efficiently. The components of control server 22 are described in more detail with respect to FIG. 3. In some embodiments, control server 22 coordinates the dispatching and charging of the assets in the network.

In general, distributed energy generation and storage system 11 includes an intelligent system that may use machine learning/artificial intelligence to aggregate utility operation, environmental, and electric wholesale market data to create algorithmic strategies to dispatch generation and energy storage resources on a portfolio basis (e.g., per node 18) into the wholesale markets. Strategies may include the use of forward markets, bilateral power purchase agreements, ancillary services, and real time and day ahead pricing markets. The algorithms may also consider the cycle life of batteries. For example, battery cost, such as cost per cycle, can be determined which facilitates maximizing the service lifetime of the distribution asset by controlling the rate of dispatch and charging.

In particular embodiments, the algorithms utilized by distributed energy generation and storage system 11 incorporate machine learning techniques to learn from and adapt to changing markets in the course of optimizing generation and storage assets. Inputs to the algorithms may include market types, inter-temporal and geographic price disparities, physical location, local constraints at nodal areas, environmental factors (weather, load profiles, etc.), and any future transmission projects that would affect the constraints. The factors may be overlaid against the backdrop of battery charging/discharging constraints and maximizing battery lifetime.

In particular embodiments, the algorithms utilized by distributed energy generation and storage system 11 automatically trade in the regional day ahead and real time markets while identifying opportunities to monetize their optionality in forward and options markets. A particular benefit is that physical assets may take advantage of expected future volatility.

In some embodiments, the algorithms are available to participants of the network and allow for dispatching to the wholesale market. For example, as electric vehicles become more ubiquitous, the algorithms may consider customer factors (e.g., driving times, preferences, location, etc.) to allow the vehicles to join the network and to sell their unused power into the wholesale markets. The dispatching may also assess the cost it would have on the vehicle battery.

A particular advantage is that as the network grows and the constraints are eased or shifted to other areas, the system may constantly adjust to optimize the different nodes in the system. In some embodiments, a blockchain system may efficiently record the transactions and track ownership of the generation output. A token may be used to efficiently transfer generation revenue and to capture the value of the growth of the network.

Particular embodiments may include a portfolio of assets that change the electric utility network with greater efficiency, price stability, and environmental sustainability. In some embodiments, owners of community renewable generation, community battery systems, and distributed renewable assets (such as residential solar panels and batteries) can automatically join a blockchain network and participate in wholesale markets.

Distributed energy generation and storage system 11 may manage assets on a portfolio basis by coordinating the dispatching and charging of some or all assets in the network. The ability to use both wholesale price volatility, distributive renewable resources, and characteristics of the battery and grid facilitates optimization of the economic dispatching and charging of the batteries.

A particular advantage is maximization of benefits for each participant; not just for their individual part, but for how the system operates as a whole. For example, similar to how an energy company can dispatch each power generator in its portfolio at discrete times, the same can occur for the dispatching of energy storage to price skim and optimize all available capacity on the network.

A benefit to participants for joining the network is access to the optimization algorithms on the portfolio basis. For the larger battery participants, it facilitates access to capital, de-risking on a single project, and profit sharing on the portfolio of batteries on the network. For distributive renewable generation, it facilitates a greater selling power and receives more revenue for their excess power that was injected back into the grid. A battery provider can utilize their excess capacity to buy and sell electricity for their own selves or others. In a world of electric vehicles, the network provides advantages in how and when to charge and discharge such batteries.

A particular example may include a network in a particular market (e.g., the electric reliability council of Texas (ERCOT)). ERCOT is an example that provides particular benefits because of the lack of specific transmission point to point requirements to link generation to load.

An example plan may include energy storage and trading models to simulate the ERCOT wholesale market. The models may include identifying nodes in the ERCOT market where congestion exists and battery portfolios to optimize the benefits of storage and create congestion relief.

Particular embodiments may implement the models with software systems that collect market data, make forecasts, dispatch and charge batteries, and adjust to changing market conditions. The models may be integrated into a blockchain to record all transactions and store decision algorithms.

As a particular example, a one MW battery project may be developed on a 2-3 acre site within an identified node of ERCOT. The battery storage system may be charged and dispatched according to the algorithms described above. The source of charging energy for the battery may include wholesale bilateral contracts, day ahead price markets, local distributed energy generation, and battery cycle life and cost characteristics. The actual performance may be compared with the predicted performance and the algorithms may be adjusted for accuracy. Transactions may be recorded on the blockchain.

Particular embodiments may accommodate network expansion through siting more community battery projects and encouraging other battery projects to participate through the network and have their batteries charged/dispatched through the trading algorithms. Particular embodiments may include cryptocurrency (e.g., PowerCoin) tokens for revenue sharing or transaction fee payment. PowerCoin tokens may be used for capital fund raising for new battery and renewable projects.

Particular embodiments may provide aggregation of energy storage devices such as batteries. For example, some energy markets (e.g., ERCOT) have a threshold amount of energy storage/production for its participants. As a specific example, an energy market may require at least 1 MW of storage/production for participants in the energy market. Such limits may prohibit individual participants (e.g., users with a single car or household battery) from participating in the energy market. The systems and networks of the disclosed embodiments, however, overcome this roadblock by aggregating multiple smaller participants such that the aggregated storage/generation amount meets the threshold requirement of the energy market. For example, the disclosed embodiments may aggregate four 250 kW battery installations into a single virtual 1 MW installation in order for the four battery installations to participate in an energy market with a 1 MW threshold requirement. This increases the accessibility of the energy market to smaller/individual participants who would otherwise be prohibited from buying and selling energy to the energy market.

The algorithms described herein may be performed by one or more control servers, such as control server 22 illustrated in FIG. 2. An example control server is illustrated in FIG. 3.

Figure 1:
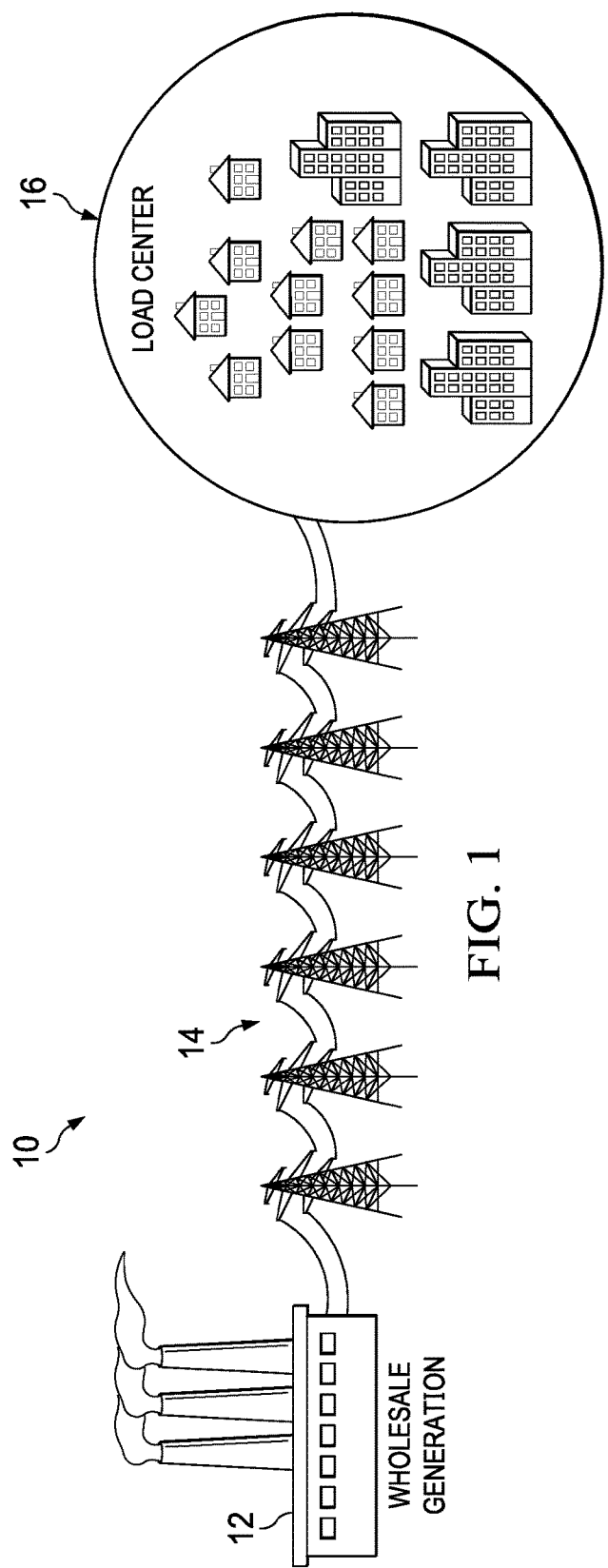
FIG. 1 is a block diagram illustrating an example power generation and distribution system, according to some embodiments.
Figure 3:
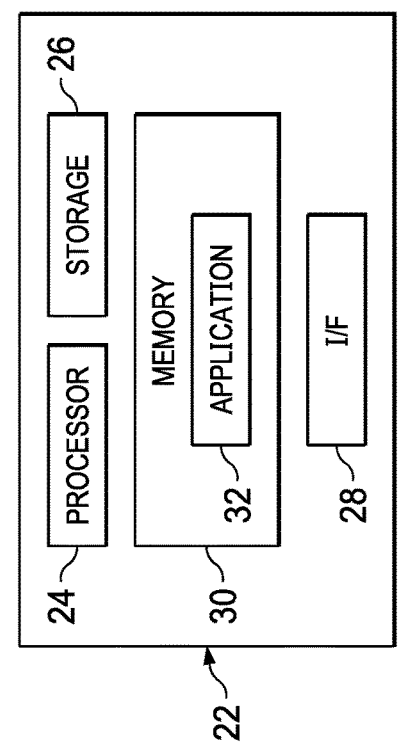
FIG. 3 is block diagram illustrating components of an example control server, according to a particular embodiment.

FIG. 3 is a block diagram illustrating components of an example control server, according to a particular embodiment. Control server 22 may refer to any computing system for performing the algorithms and communications described herein, and may include processor 24, storage 26, interface 28, and memory 30. In some embodiments, control server 22 may refer to any suitable combination of hardware and/or software implemented in one or more modules to process data and provide the described functions and operations. In some embodiments, the functions and operations described herein may be performed by a pool of control servers 22.

Memory 30 may refer to any suitable device capable of storing and facilitating retrieval of data and/or instructions. Examples of memory 30 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 3 illustrates memory 30 as internal to control server 22, memory 30 may be internal or external to control server 22, depending on particular implementations. Also, memory 30 may be separate from or integral to other memory devices to achieve any suitable arrangement of memory devices for use in system 11.

Memory 30 is generally operable to store one more applications 32. Applications 32 generally refers to logic, rules, algorithms, code, tables, and/or other suitable instructions for performing a particular application described herein.

Processor 24 is communicably coupled to memory 30. Processor 24 is generally operable to execute application 32 stored in memory 30. Processor 24 may comprise any suitable combination of hardware and software to execute instructions and manipulate data to perform the described functions for control server 22. In some embodiments, processor 24 may include, for example, one or more computers, one or more central processing units (CPUs), one or more microprocessors, one or more applications, and/or other logic.

Storage 26 is communicably coupled to processor 24. In some embodiments, storage 26 may refer to any suitable device capable of storing and facilitating retrieval of data and/or instructions. Examples of storage 26 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Storage 26 may store data, such as contract data, device performance data, etc.

In some embodiments, interface 28 (I/F) is communicably coupled to processor 24 and may refer to any suitable device operable to receive input for control server 22, send output from control server 22, perform suitable processing of the input or output or both, communicate to other devices, or any combination of the preceding. Interface 28 may include appropriate hardware (e.g. modem, network interface card, etc.) and software, including protocol conversion and data processing capabilities, to communicate through network 20 or other communication system that allows control server 22 to communicate to other components of system 11. Interface 28 may include any suitable software operable to access data from various devices such as components of nodes 18, or other components not illustrated such as energy trading/pricing/forecasting platforms.

In some embodiments, an energy network may include machine learning software systems, user interface applications, and hardware controllers to dynamically optimize the dispatch of energy resources, which may include batteries, renewable or nonrenewable distributed generation, and demand side management into a common electric grid. The system may have the ability to register new devices or new members onto its network to automatically include their individual generation, storage, or load characteristics in forecasting, dispatch, and settlement functions of the system.

Figure 4:
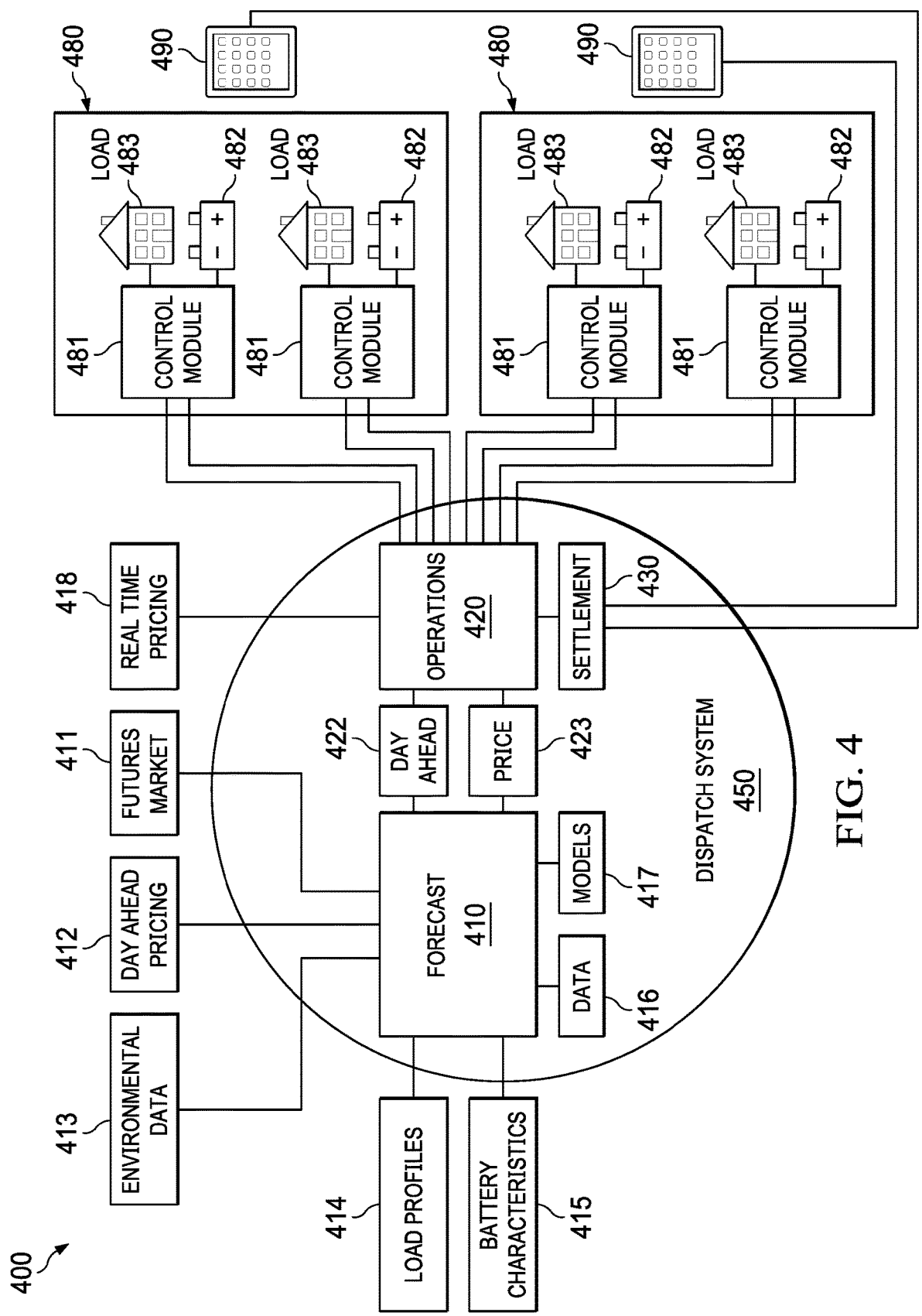
FIG. 4 is a block diagram illustrating a network 400 for energy dispatch and deployment, according to some embodiments.

FIG. 4 is a block diagram illustrating a network 400 for energy dispatch and deployment, according to some embodiments. In particular embodiments, network 400 may be a network for battery dispatch and deployment. Network 400 includes one or more nodes 480 and a battery charge/dispatch system 450. Nodes 480 may function in the same manner as described with respect to Nodes 18 of FIG. 2 and include energy resources, such as batteries 482. Nodes 480 may include a plurality of batteries 482, controllers 481, and loads 483. Controllers 481 may be any device operable to control the charging or discharging of a battery 482. In some embodiments, a controller 481 may be associated with a plurality of batteries 482 at a node 480. In other embodiments, one controller 481 may be associated with a single battery 482.

Batteries 482 may include any energy storage device including, but not limited to, chemical batteries such as lead-acid, lithium ion, nickel cadmium, nickel metal hydride, lithium ion, or any other battery chemistries; capacitors and super capacitors; kinetic energy storage devices such as fly wheels; thermal energy storage devices such as molten salts and other heat transfer fluid systems; gravity based energy storage systems such as elevated water tanks and reservoirs; and any other energy storage devices capable of storing a form of energy and converting it into electricity. Loads 483 may include any electrical loads found at nodes 480 such as industrial facilities, residential facilities, commercial facilities, electric vehicle charging stations, or any other location or device that makes use of electrical power. Loads 483 may also include batteries 482 that are being charged. In some embodiments, nodes 480 may also include electrical generation components such as solar cells, wind turbines, hydroelectric generators, or other electricity generating devices.

Battery charge/dispatch system 450 may include one or more computer systems such as one or more of control servers 22 illustrated in FIG. 3. Battery charge/dispatch system 450 may include a forecasting component 410, an operations component 420, and a settlement component 430. Forecasting component 410 may include algorithms that utilize knowledge of wholesale power trading and operations of energy resources to produce dispatch schedules to dispatch the resources into a market. Forecasting component 410 may take into consideration not only the power market pricing, but also the operational aspect of the resources. Operations component 420 may dispatch the resource, such as a battery 482, and receive real-time telecommunications from the resources to make automatic on-the-fly adjustments to the schedule. Settlement component 430 may record different properties of the individual resource time interval dispatch, including but not limited to the owner of the energy resource, the amount of energy dispatched from or charged into an energy resource at a particular time, the price of power at the time an energy resource is charged or discharged, and any contracts (e.g. futures contracts) associated with the energy resource.

Forecasting component 410 may use mathematical models, artificial intelligence (AI) and machine learning to automatically receive data feeds pertaining to a variety of information. The information utilized by forecasting component 410 may include one or more of the wholesale (e.g. ERCOT) market day ahead prices 412 and real-time prices 418, environmental factors 413, load profiles 414 and battery characteristics 415. In some embodiments, these inputs may be stored in a data repository 416. Data repository 416 may include servers, storage media, databases and any other system capable of storing data. Forecasting component 410 may include the use of models 417. In some embodiments, models 417 may be stored in forecasting component 410 and accessed by forecasting component 410 as needed. Models 417 may include predictive analysis models that may calculate the optimized lifetime of batteries 482.

In general, forecasting component 410 analyzes various variables that may affect energy prices in order to generate a forecasted energy price curve. The forecasted energy price curve may indicate, for example, an expected price of a unit of electricity at each particular time unit (e.g., each minute) of a particular day. The forecasted energy price curve may then be used to charge and discharge an energy storage device (e.g., a battery) at particular points in a day. For example, a battery may be charged at one or more valleys in the forecasted energy price curve in a particular day and may be discharged at one or more peaks in the forecasted energy price curve in a particular day. The various variables analyzed by forecasting component 410 may include the day-ahead market, the real-time market, weather data (e.g., weather forecasts), historical energy prices, demand/load variables for a substation, fuel (e.g., natural gas) prices and supply per substation, weekend/weekday/holiday data, transmission line congestion data, and renewable generation (e.g., wind power and solar output). As one example, forecasting component 410 may analyze historical energy prices for a particular day and determine that energy prices are likely to be highest between the hours of 5-6 PM on that particular day. As another example, forecasting component 410 may analyze weather forecasts and renewable generation data and determine that since it is likely to be cloudy on a particular day and a large portion of available electricity generation is provided by solar arrays, the amount of available electricity for that day may be lower. As a result, forecasting component 410 may increase the forecasted price of electricity for that particular day.

Forecasting component 410 may create outputs of day ahead market (DAM) dispatch and offer schedules 422 and real-rime (RT) dispatch and offer schedules 423. Forecast component 410 may automatically decide which markets (day ahead, real-time, etc.) each battery 482 should either charge or dispatch into. Forecasting component 410 may also interface with futures markets 411 and provide financial instruments to hedge against the physical assets of the network. For example, forecasting component 410 may elect to sell a futures contract for dispatching a battery 482 on a particular date based on the data inputs it receives. In some embodiments, forecasting component 410 may generate node-to-node dispatch schedules to enable different nodes 480 to directly sell power to one another. In some embodiments, forecasting component 410 may also create peer-to-peer dispatching schedules that forego interaction with the wholesale market to directly discharge one battery 482 to the owner of a load 483.

Forecasting component 410 may have a variety of inputs which are described in more detail herein. Inputs to forecasting component 410 may include one or more of: data relating to market conditions including real time pricing 418, day ahead pricing 412, zonal pricing, nodal pricing, point-to-point pricing, load profiles 414, environmental data 413, and battery characteristics 415.

Real time pricing 418 and day ahead pricing 412 may include data from wholesale electric markets. In some embodiments, pricing may be recorded with respect a location specific to an entire region (e.g. ERCOT), general zones, or specific nodes such as one or more of nodes 480 where price signals are available (e.g., zonal, nodal, and point-to-point pricing). In some embodiments, day ahead prices 412 are offered on the previous day and updated are on an hourly basis. The day ahead market may be settled on a 15-minute basis. In some embodiments, real time prices 418 may be issued on an hourly basis but dispatched on a 5-minute basis. The real time market may also be settled on a 15-minute basis.

Additional sources of pricing information may include, but are not limited to: congestion revenue rights (CRR), which may be point to point auctions that are bid on a monthly basis; bilateral contracts which may be contracts that vary in time frame and price and may be settled on a 15-minute basis; the ancillary services market which may feature prices that are set day-ahead and in real-time; and any future plans of the electric grid that may affect congestion pricing (e.g. plans to build new transmission or generation capacity).

Input from load profiles 414 may include electric grid nodal point energy consumption profiles or individual energy consumption profiles of network members who have any battery, distributed generation, or demand side management contributions to system. Additionally, energy profile commitments contracted through bilateral agreements with wholesale market or between network members may be included in load profiles 414. Network members may set preferences in how their resources, such as batteries 482 or load 483, are used may also be included in load profiles 414 to be taken into consideration by forecasting component 410. Such user preferences may include risk tolerance, equipment life cycle cost/benefit analysis, geographical location, personal use levels, and the like. Load profiles 411 may also include an end-use study of each node, consisting of an external audit of the types of customers that are within the particular node 480. For example, load profile information 414 may include the knowledge that certain nodes 480 are industrial facilities and therefore have a known or predictable energy load profile and other nodes 480 are residential and therefore have a different load profile. Further, in some embodiments, load profile information may include granular data for individual loads, such as the type of equipment and operations scheduled maintained by an industrial facility or the type, number, and charging schedule of electric cars owned by an individual within a node. More detailed models may provide better estimates for behavior the loads demonstrate in operation and therefore may enable forecasting component 410 to provide better forecasts of a particular node 480 than a general market profile.

Battery characteristics 415 may include, for each battery 482, a rated number of charge/discharge cycles of the battery, a count of how many times the battery has been charged and discharged, battery chemistries, nominal voltage, capacity, loading capability of the battery, discharge rate of the battery, and power factor of the battery. For example, battery performance may change as a battery experiences more charge and discharge cycles and battery characteristics 415 may maintain a record of how performance changes, or is predicted to change, for each battery 482 given a certain charging and discharging behavior of that battery. Forecasting component 410 may using the information in battery characteristics 415 to determine a predictive cost function associated with charging and discharging each battery. Forecasting component 410 may then utilize mathematical models 417 to compare this cost function to predicted electric prices to develop an optimized charging or dispatching schedule for each battery. In some embodiments, forecasting component may use AI and/or machine learning to optimize the battery life cycle, based on the preference of the battery owner.

Environmental data 413 may include real-time weather data and forecasted weather data of the weather, humidity, temperature, and cloud cover at each node point 480 at which a battery 482 is located. It may also have a real-time weather feed of actual weather components measured by instrumentation in the field. In some embodiments, forecasting component may use environmental data 413 as part of a model to make energy usage and price predictions in order to develop charging and discharging schedules for batteries 482. For example, based on environmental data indicating cloud coverage of a particular node 480, forecasting model 410 may produce a dispatching schedule calling for a battery in that node to discharge when the forecasting model 410 predicts the node to be experiencing cloud over.

In some embodiments, each input may feed into data repository 416. Data repository 416 may store historical input data in addition to any newly received input data. In some embodiments, data repository 416 may enable forecasting component 410 to utilize historical data of any of the data inputs become temporarily unavailable. In other embodiments, data inputs may feed directly into forecasting component 410. In yet other embodiments, data inputs may feed into both data repository 416 and forecasting component 410.

Forecasting component 410 may generate outputs utilizing the data inputs it receives. Outputs from forecasting component 410 may include day ahead market schedules 422 and real time market schedules 423. In some embodiments, day ahead market schedules 422 may be calculated the previous day. Day ahead market schedules 422, in particular embodiments, may either submit an hourly offer schedule or may be a price taker of the Local Marginal Price (LMP), depending the size of the individual battery 482 at its node. Battery charge/dispatch system 450 may have the ability to aggregate batteries or distributed generation, or demand side management at that node, depending on regulatory approvals and wholesale market protocol changes. The real time market schedules 423 may be calculated for each qualifying battery 482 in the network on the day. In some embodiments, real time market schedules 423 may be updated on an hourly basis or more frequently. For example, as weather conditions change, such a change may be reflected in environmental data 413, causing forecasting component 410 to update real time market schedules 423. In some embodiments, the real time market schedules 423 may be constantly updated based on data coming received from real-time pricing 418.

In some embodiments, battery charge/dispatch system 450 may also include operations component 420. Operations component 420 may interact with forecasting component 410 and external real-time price feed 418 to provide battery operation decisions. Operations component 420 may communicate its battery operation decisions by sending control signals to the various control modules 481 for the batteries 482 to charge, discharge, or disconnect. Control modules 481 may include hardware, software and input/output (I/O) devices needed to control and operate batteries 482. In addition, control modules 481 may provide signals back to operations component 420 on the status of batteries 482. The status may include battery level, cycle performance, energy amount consumed or dispatched, battery temperature reading, and other environmental components. This information may be sent to data repository 416 for use by forecasting component 410. In some embodiments, battery status information may be communicated to data repository 416 on a real time basis.

Additionally, in some embodiments, operations component 420 may provide load control decisions and send load control signals to control modules 481, which may be operable to control loads 483. For example, control modules 481 may be able to switch loads 483 on or off, or throttle the energy use of loads 483. Control modules 481 may include hardware, software and input/output (I/O) devices needed to control and operate loads 483. In addition, control modules 481 may provide signals back to operations component 420 on the status of loads 483. The status may include power consumption, power requirements, temperatures, and other environmental components. This information may be sent to data repository 416 for use by forecasting component 410.

In some embodiments, load status information may be communicated to data repository 416 on a real time basis.

Operations component 420 may also automatically register new energy storage devices or new members onto its network when they are added to the network. For example, if a new battery 482 or load 483 is added to a node 480, a control module 481 may automatically send the individual generation, storage, or load characteristics of the added battery 482 or load 483 to operations component 420. Operations component 420 may then forward this information to data repository 416 to be stored as battery characteristics 415 or load profile 414 data for use by forecasting component 410 in forecasting, dispatch, and settlement functions of the system.

Battery charge/dispatch system 450 may also include settlement component 430. Settlement component 430 may take information from operations component 420 and create a transaction record of the charging or dispatching of each individual battery 482. The transaction record may contain the appropriate timestamp of the transaction, the type of transaction (real-time, day ahead market, bilateral contract, or another transaction described herein), owners of the battery, amount of energy charged, amount of energy discharged, price, and any other variable. This information may be stored onto a blockchain that contains smart contracts for each battery 482. The blockchain may allow for customers to track their batteries operations, and to give customer preferences (e.g., how much to discharge their battery, how often should the battery cycle, how much of the battery should be kept for internal use, etc.). In some embodiments, the blockchain may enable smart contracts for individual users that are capable of updating in real time as the users' resources, such as batteries 482, are discharged or charged.

Communication of information between the network and individual customers may done through applications 490 that connect to the blockchain. Applications 490 may operate on a user device such as a smartphone, laptop, tablet, desk top computer or other network connected devices. In some embodiments, application 490 may allow individual users to review data related to the charging and discharging of batteries 482 as well as the price paid or received for charging or discharging the batteries 482. Application 490 may also allow users to visualize network activity by providing a graphical representation of the network as well as charging and discharging behavior of any batteries 482 associated with the users.

In some embodiments, the blockchain may take on intelligence functionality and operational components, such as operations component 420, and may reside at the smart contract level. This distribution of intelligence may reduce cost of the network, including battery charge/dispatch system 450, and may allow for smaller resources to be dispatched, tracked, and settled. In these embodiments, the efficiency obtained by implementing operational components into the block chain may allow for smaller rooftop solar, electric vehicles, and individual demand-side management programs to be aggregated into the wholesale market or allow the peer-to-peer trading of these distributed assets. The blockchain may enable tokens to be used to automatically pay different resource owners on the network to create an efficient payment system that can handle small and large-scale participants. Using applications 490, consumers may be able buy tokens for their smart contract. The customer and the network may be able set up conditions that determine when tokens may transferred from one smart contract to another.

In practice, forecasting component 410 may utilize data inputs 411-415 and battery condition data received from battery control modules 481 to generate optimized schedules for deployment of batteries 482. For example, using mathematical models 417, forecasting component 410 may determine that, based on data inputs 411 through 415, a battery 482 at node 480 should discharge into the network because the price received for selling electricity today is determined to be greater than the cost of buying electricity is predicted to be tomorrow. In this example, instructions from forecasting component 410 are communicated to operations component 420, which in turn sends instructions to control module 481 for battery 482 to discharge into the grid. Control module 482 may then send information about the amount of electricity discharged from battery 482 back to operations component 420. Operations component 420 may then forward this information to settlement component 430 which records the transaction and communicates the details of the transaction to the owner of battery 482 through application 490.

Figure 5:
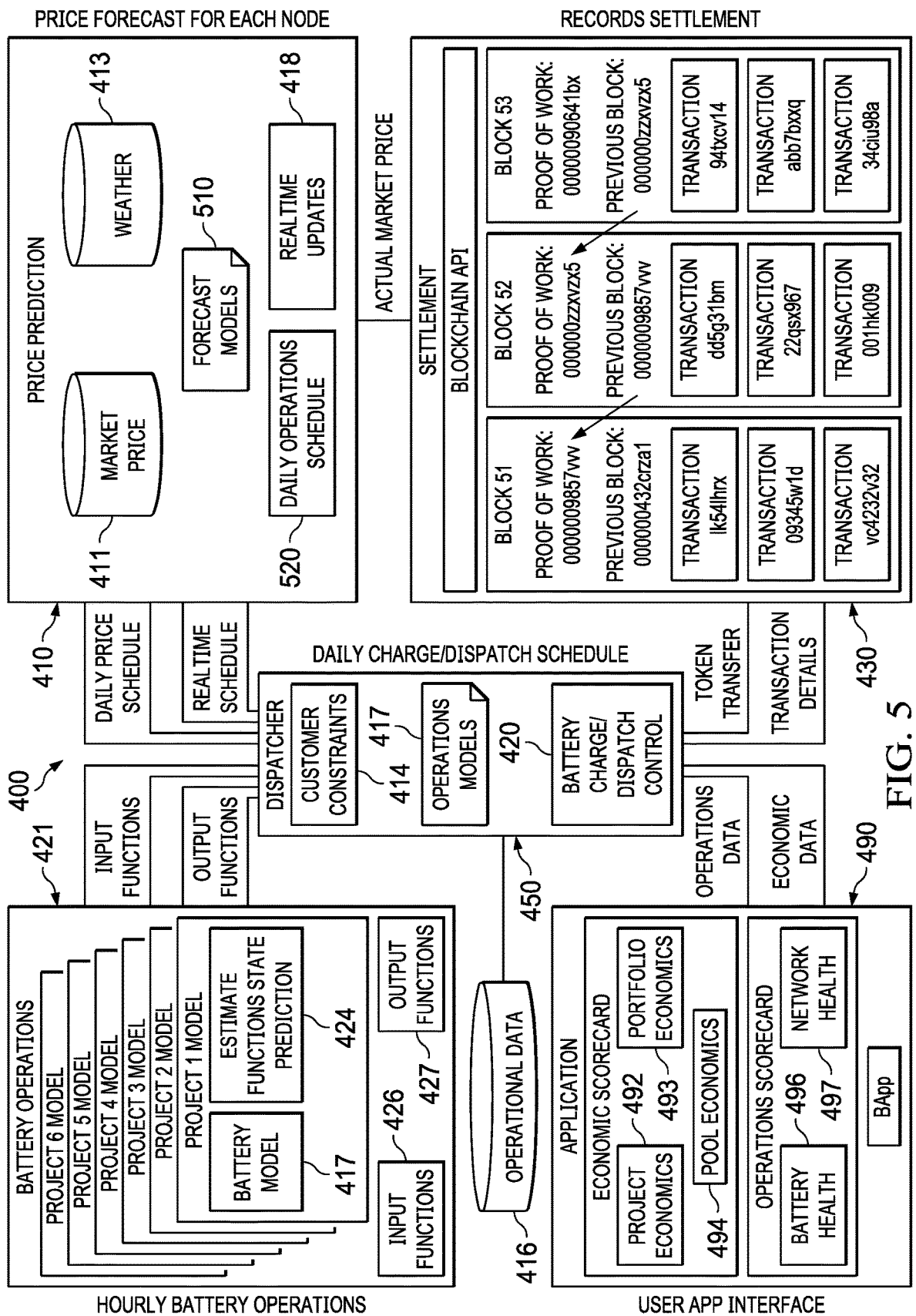
FIG. 5 is a block diagram illustrating another view of network 400 of FIG. 4, according to some embodiments.

FIG. 5 is a block diagram illustrating another view of network 400 for energy dispatch and deployment, according to some embodiments. FIG. 5 is provided to provide more details of network 400 for energy dispatch and deployment, wherein like numerals are used for like and corresponding parts of the various drawings. In particular, network 400 as illustrated in FIG. 5 includes forecasting component 410, settlement component 430, data repository 416, application 490, battery charge/dispatch system 450, and a battery operations component 421.

In general and as described above, network 400 utilizes data such as environmental data, customer constraints, and electric wholesale market data to dispatch generation and energy storage resources on a portfolio basis into the wholesale markets. As a specific use example, consider a scenario where a user has purchased and installed a battery in their home that is used to store energy from the electric grid and power their home from the stored energy. Or, as an alternate example, consider a scenario where a user has purchased an electric vehicle that has a battery that may be connected to the electric grid via a port in their home. In both scenarios, the user may wish to participate in the wholesale electric market by selling energy stored in their batteries back to the grid. To do so, the user may utilize application 490 to communicate with network 400. For example, the user may utilize application 490 to provide various customer constraints via a load profile 414. The constraints may be, for example, what time of day their battery may be discharged, how many times per day/week/month their battery may be discharged, how much their battery may be discharged (e.g., down to 40%), and the like. Once registered with network 400, the user's battery may then be charged and then discharged back to the grid based on the customer's constraints, environmental data, and electric wholesale market data. For example, if environmental data 413 indicates that it will be sunny and hot at 3 PM on the following day, network 400 may command (subject to the user's provided constraints) the user's battery to charge at night while electricity prices are low and then discharge to the grid on or about 3 PM the following day when electricity prices are higher due to demand. Network 400 may utilize settlement component 430 to record the amount of energy dispatched from the battery and the price of power at the time an energy resource is discharged, as described in detail above (e.g., using blockchain). The user may utilize application 490 to view the economics of their batteries as well as the operational status of their batteries and the network, as described in more detail below. As a result, network 400 enables various users across a region to participate in the electric wholesale market. This helps to alleviate the problems with the existing large-scale, centralized electricity model as described above.

As indicated above in reference to FIG. 4, the center of network 400 is battery charge/dispatch system 450. Battery charge/dispatch system 450 is communicatively coupled to forecasting component 410, settlement component 430, applications 490, data repository 416, and battery operations component 421. In general, battery charge/dispatch system 450 analyzes various inputs/data from various sources (e.g., customer constraints 414, data repository 416, environmental data 413, data from wholesale electric markets, etc.) in order to control the operation of distributed batteries 482. In some embodiments, battery charge/dispatch system 450 includes load profile 414 (also known as customer constraints 414), models 417, and operations component 420, each of which are described above in reference to FIG. 4.

In some embodiments, battery charge/dispatch system 450 receives daily price schedules and real-time schedules from forecasting component 410. Forecasting component 410, as described above, may include futures markets repository 411, environmental data repository 413, and real time pricing 418. In addition, some embodiments of forecasting component 410 may include forecast models 510 and daily operations schedules 520. Forecast models 510 in general are economic models that include predicted electricity prices for a specific day and region. Daily operations schedules 520 in general are schedules for a particular day for each node. For example, a daily operations schedule 520 may indicate when a particular node is discharging and charging from the grid.

In some embodiments, battery charge/dispatch system 450 sends/receives transaction details and token transfers to settlement component 430. As described above, settlement component 430 may take information from operations component 420 and create a transaction record of the charging or dispatching of each individual battery 482. This information may be stored onto a blockchain that contains smart contracts for each battery 482. The blockchain may allow for customers to track their batteries operations, and to give customer preferences (e.g., how much to discharge their battery, how often should the battery cycle, how much of the battery should be kept for internal use, etc.).

In some embodiments, battery charge/dispatch system 450 sends/receives input functions and output functions to battery operations component 421. In general, battery operations component 421 may be a sub-component of operations component 420 in some embodiments and may control the hourly operations of battery 482. In some embodiments, battery operations component 421 may include an input function component 426 and an output function component 427. Input function component 426 controls the inputs of battery 482 and output function component 427 controls the outputs of battery 482. In some embodiments, battery operations component 421 includes one or more project models. Each project model may correspond to a particular battery project (e.g., a particular installation) and may include mathematical model 417 and a state prediction component 424. State prediction component 424 provides a prediction of a state of battery 482 using current conditions and mathematical model 417 for battery 482.

In some embodiments, battery charge/dispatch system 450 provides operations data and economic data to application 490. As described above, a user may utilize application 490 (e.g., using a smartphone) to view the economics of their batteries as well as the operational status of their batteries and network 400. For example, application 490 may provide an economic scorecard 491. In some embodiments, economic scorecard 491 includes project economics 492, portfolio economics 493, and pool economics 494. Project economics 492 may provide financial details about a specific battery installation project (e.g., at a specific location), portfolio economics 493 may provide financial details about a portfolio of batteries, and pool economics may provide financial details about a defined pool of batteries. In addition, application 490 may provide an operations scorecard 495 in some embodiments. Operations scorecard 495 may include a battery health component 496 and a network health component 497. Battery health component 496 may provide operational health of a specific battery (e.g., current capacity, cycles remaining, etc.). Network health component 497 may provide operational status of network 400.

In operation, battery charge/dispatch system 450 may utilize various data inputs (e.g., 411-415) to control the charging and discharging of batteries 482. For example, using mathematical models 417, forecasting component 410 of battery charge/dispatch system 450 may determine that, based on data inputs 411 through 415, a battery 482 at a specific node 480 should discharge into the network at a specific time (e.g., 3 PM on a hot day) because the price received for selling electricity at that time is determined to be greater than the cost of buying electricity is predicted to be tomorrow. In this example, instructions from forecasting component 410 are communicated to battery charge/dispatch system 450, which in turn communicates with battery operations component 421 in order to determine instructions for battery 482. Battery charge/dispatch system 450 may then send instructions to control module 481 for battery 482 to discharge into the grid at a specific time. Control module 482 may then send information about the amount of electricity discharged from battery 482 back to operations component 420 of battery charge/dispatch system 450. Operations component 420 may then forward this information to settlement component 430 which records the transaction and communicates the details of the transaction to the owner of battery 482 through application 490.

Although particular embodiments and their advantages have been described in detail, it should be understood that various changes, substitutions and alternations can be made herein without departing from the spirit and scope of the embodiments.

The invention claimed is:

1. A system comprising:
an energy storage device geographically proximate a plurality of load centers, the energy storage device coupled to one or more of the plurality of load centers for supplying energy to the load centers, and coupled to an energy generation source for receiving energy from the energy generation source; and
a control system comprising a processor, the control system operable to:
receive energy market data;
monitor the plurality of load centers, the energy storage device, and the energy generation source;
determine, from a plurality of energy markets, a selected energy market for the energy storage device, wherein:
the plurality of energy markets comprises a day ahead market and a real time market; and
the selected energy market is determined by a forecasting component of the control system using one or more of environmental data, battery characteristics, a load profile, real time pricing data, day ahead pricing data, and futures market data;

determine an expected wholesale electricity price of a unit of electricity for each particular time unit of a plurality of time units of a particular day; and control the charging and dispatching of the energy storage device for each particular time unit of the particular day based on the monitoring, the determined expected wholesale electricity price, and the energy market data, wherein:

the energy storage device is charged from the selected energy market; and the energy storage device is discharged into the selected energy market.

2. The system of claim 1, wherein the control system comprises the forecasting component, an operations component, and a settlement component.

3. The system of claim 2, wherein the operations component receives a dispatch schedule from the forecasting component and provides instructions to the energy storage device based on the dispatch schedule.

4. The system of claim 2, wherein the forecasting component optimizes dispatch schedules associated with the energy storage device based on a mathematical model.

5. The system of claim 2, wherein the settlement component records a transaction record in a blockchain associated with an owner of the energy storage device in response to the operations component providing a charging or dispatching instruction to the energy storage device.

6. The system of claim 1, wherein the expected wholesale electricity price of the unit of electricity for each particular time unit of the plurality of time units of the particular day comprises the expected wholesale electricity price of the unit of electricity for each minute of the particular day.

7. The system of claim 1, wherein the energy market data comprises real-time wholesale electricity pricing and day-ahead wholesale electricity pricing.

8. The system of claim 1, wherein:
the control system is further operable to:
generate a plurality of day ahead market schedules; and
generate a plurality of real time market schedules; and
determining the selected energy market for the energy storage device is based on the plurality of day ahead market schedules and the plurality of real time market schedules.

9. A system comprising:
a control server comprising a processor coupled to a memory, the processor operable to:
receive charging and dispatching information from a plurality of distributed energy storage devices;
receive energy market data;
determine, from a plurality of energy markets, a selected energy market for the energy storage device, wherein:
the plurality of energy markets comprises a day ahead market and a real time market; and
the selected energy market is determined by a fore c as ting component of the control server using one or more of environmental data, battery characteristic data, a load profile, real time pricing data, day ahead pricing data, and futures market data;
determine an expected wholesale electricity price of a unit of electricity for each particular time unit of a plurality of time units of a particular day; and
based on the received charging and dispatching information, the determined expected wholesale electricity price, the selected energy market, and the received energy market data, determine a charging and dispatching schedule for the plurality of distributed energy storage devices for each particular time unit of the particular day that optimizes an amount of energy that may be resold into the energy markets from the plurality of distributed energy storage devices.

10. The system of claim 9, wherein the processor is further operable to:
determine the charging and dispatching schedule based on one or more of the environmental data, the battery characteristic data, and the load profile.

11. The system of claim 9, wherein energy market data comprises one or more of real time pricing data, day ahead pricing data, and futures market data.

12. The system of claim 9, wherein the processor is further operable to record transactions associated with each energy resource to one or more blockchains.

13. The system of claim 12, wherein each energy resource is associated with a single blockchain.

14. A system comprising:
a plurality of load centers;
an energy generation source;
an energy storage device geographically proximate the plurality of load centers, the energy storage device coupled to one or more of the plurality of load centers for supplying energy to the load centers, and coupled to the energy generation source for receiving energy from the energy generation source; and
a control system comprising a processor, the control system operable to:
receive energy market data;
monitor the plurality of load centers, the energy storage device, and the energy generation source;
generate a plurality of day ahead market schedules;
generate a plurality of realtime market schedules;
determine, from a plurality of energy markets comprising a day ahead market and a real time market, a selected energy market for the energy storage device, wherein determining the selected energy market for the energy s to rage device is based on the plurality of day ahead market schedules and the plurality of real time market schedules;
determine an expected wholesale electricity price of a unit of electricity for each particular time unit of a plurality of time units of a particular day; and
control the charging and dispatching of the energy storage device for each particular time unit of the particular day based on the monitoring, the determined expected wholesale electricity price, and the energy market data, wherein:
the energy storage device is charged from the selected energy market; and
the energy storage device is discharged into the selected energy market.

15. The system of claim 14, wherein the control system comprises a forecasting component, an operations component, and a settlement component.

16. The system of claim 15, wherein the forecasting component utilizes one or more of environmental, battery characteristic, load profile, real time pricing, day ahead pricing, and futures market data.

17. The system of claim 15, wherein the operations component receives a dispatch schedule from the forecasting component and provides instructions to the energy storage device based on the dispatch schedule.

18. The system of claim 15, wherein the settlement component records a transaction record in a blockchain associated with an owner of the energy storage device in response to the operations component providing a charging or dispatching instruction to the energy storage device.

19. The system of claim 17, wherein the operations component determines the instructions based on a comparison of real time price data to the dispatch schedule.

* * * * *